United States Patent
Jerng et al.

(10) Patent No.: US 9,397,720 B2
(45) Date of Patent: Jul. 19, 2016

(54) METHOD AND SYSTEM FOR INTEGRATING TRANSMIT SWITCH FUNCTIONALITY IN A WLAN RADIO TRANSCEIVER

(75) Inventors: Albert Chia-Wen Jerng, Los Gatos, CA (US); Jen-Wei Ko, Cupertino, CA (US); Weijun Yao, Mountain View, CA (US); Eric Chiyuan Lu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 383 days.

(21) Appl. No.: 12/635,382

(22) Filed: Dec. 10, 2009

(65) Prior Publication Data

US 2011/0143690 A1    Jun. 16, 2011

(51) Int. Cl.
*H04B 1/44* (2006.01)
*H04B 1/00* (2006.01)

(52) U.S. Cl.
CPC ... *H04B 1/44* (2013.01); *H04B 1/00* (2013.01)

(58) Field of Classification Search
CPC ............ H04B 1/48; H04B 1/44; H04B 1/406
USPC ......... 455/73, 78, 80, 82, 83, 69, 88, 500, 81, 455/67.11, 67.13; 333/124, 25, 103
See application file for complete search history.

(56) References Cited

U.S. PATENT DOCUMENTS

| | | | | |
|---|---|---|---|---|
| 6,356,536 B1 * | 3/2002 | Repke | | H04B 1/525 370/282 |
| 6,735,418 B1 * | 5/2004 | MacNally | | H04B 1/0458 455/78 |
| 7,283,793 B1 * | 10/2007 | McKay | | H04B 1/0458 333/103 |
| 7,299,006 B1 * | 11/2007 | Rofougaran | | H03D 3/244 323/267 |
| 7,385,458 B2 * | 6/2008 | McKay | | H01P 5/10 333/25 |
| 7,702,296 B2 * | 4/2010 | Siu | | H03F 1/223 333/100 |
| 8,041,294 B2 * | 10/2011 | Rofougaran | | H03B 21/01 327/101 |
| 8,099,062 B1 * | 1/2012 | Terrovitis | | H04B 1/48 455/73 |
| 8,138,853 B2 * | 3/2012 | Chu | | H03H 7/38 333/101 |
| 2003/0017809 A1 * | 1/2003 | Garlepp | | H04B 1/0003 455/87 |
| 2004/0033787 A1 * | 2/2004 | Weber | | H04B 7/04 455/78 |
| 2004/0248529 A1 * | 12/2004 | Park | | H04B 1/48 455/127.1 |
| 2005/0143024 A1 * | 6/2005 | Sung | | H04B 7/0608 455/101 |

(Continued)

OTHER PUBLICATIONS

Feng-Jung Huang, et al., Single-Pole Double-Throw CMOS Switches for 900-MHz and 2.4-GHz Applications on p-Silicon Substrates, IEEE Journal of Solid-State Circuits, vol. 39, No. 1, Jan. 2004.

*Primary Examiner* — MD Talukder
(74) *Attorney, Agent, or Firm* — Sawyer Law Group, P.C.

(57) ABSTRACT

A radio transceiver is disclosed. The transceiver comprises an integrated circuit. The integrated circuit comprises a transmit path; a first switch coupled in series with the output of the transmit path; a receive path; and a second switch coupled as a shunt with the input of the receive path. The transceiver further comprises a plurality of external matching networks coupled to the transmit and receive paths of the integrated circuit to ensure minimal loading from one path to the other. The transceiver also comprises a shared balun for converting differential signals from the plurality of external matching networks to single ended signals; and an antenna to interface with the single ended signals. A method and system in accordance with an embodiment enables tying together the transmit path and the receive paths of a radio transceiver without the need for an external T/R switch. A method and system in accordance with an embodiment minimizes the loading effects between the transmit path and the receive path such that output power and NF noise figure are not degraded after tying the transmit path and the receive path together.

9 Claims, 3 Drawing Sheets

(56) References Cited

U.S. PATENT DOCUMENTS

| | | | |
|---|---|---|---|
| 2005/0215205 A1* | 9/2005 | Rofougaran | 455/78 |
| 2005/0245201 A1* | 11/2005 | Ella | H04B 1/005 455/78 |
| 2006/0084392 A1* | 4/2006 | Marholev et al. | 455/78 |
| 2007/0117523 A1* | 5/2007 | Weber | H04B 7/04 455/81 |
| 2007/0232241 A1* | 10/2007 | Carley et al. | 455/83 |
| 2008/0165794 A1* | 7/2008 | Sutardja | H03K 17/693 370/420 |
| 2009/0036065 A1* | 2/2009 | Siu | H03F 1/223 455/78 |
| 2009/0251221 A1* | 10/2009 | Gorbachov | H04B 1/48 330/301 |
| 2010/0109798 A1* | 5/2010 | Chu | H03H 7/38 333/124 |
| 2010/0158084 A1* | 6/2010 | Voinigescu | H04B 1/40 375/219 |
| 2010/0194493 A1* | 8/2010 | Thompson | H01P 5/10 333/132 |
| 2010/0197244 A1* | 8/2010 | Gomez | H03F 1/0277 455/78 |
| 2010/0321129 A1* | 12/2010 | Onody et al. | 333/124 |
| 2011/0128288 A1* | 6/2011 | Petrou et al. | 345/428 |
| 2011/0143690 A1* | 6/2011 | Jerng | H04B 1/44 455/78 |
| 2011/0285475 A1* | 11/2011 | Lu | 333/104 |
| 2013/0035048 A1* | 2/2013 | Chee | H04B 1/525 455/83 |

* cited by examiner

METHOD AND SYSTEM FOR INTEGRATING TRANSMIT SWITCH FUNCTIONALITY IN A WLAN RADIO TRANSCEIVER

FIELD OF THE INVENTION

The present invention relates generally to radio transceivers and more particularly relates to transmit/receive (T/R) switch functionality in such transceivers.

BACKGROUND

Wireless radio includes a transmit path and a receive path. If these paths are simply tied together loading offset occurs. This loading effect may degrade the transmit path output match and cause a reduction in power output during transmission. Furthermore, the loading may degrade the receive path input match and cause an increase in receive path noise.

Conventional wireless radios require an external transmit/receive (T/R) switch to prevent harmful loading effects between transmit path and the receive path. Fully integrated T/R switches require on-chip matching of both the transmit path and the receive path front-ends. This adds additional loss on both the transmit path and the receive path. Usually these switches are external to the integrated circuit. In so doing there are associated cost and board space penalties.

Accordingly, what is desired is to provide a system and method that overcomes the above issues. The present invention addresses such a need.

SUMMARY OF THE INVENTION

A radio transceiver is disclosed. The transceiver comprises an integrated circuit. The integrated circuit comprises a transmit path; a first switch coupled in series with the output of the transmit path; a receive path; and a second switch coupled as a shunt with the input of the receive path. The transceiver further comprises a plurality of external matching networks coupled to the transmit and receive paths of the integrated circuit to ensure minimal loading from one path to the other. The transceiver also comprises a shared balun for converting differential signals from the plurality of external matching networks to single ended signals; and an antenna to interface with the single ended signals.

A method and system in accordance with an embodiment enables tying together the transmit path and the receive paths of a radio transceiver without the need for an external T/R switch. A method and system in accordance with an embodiment minimizes the loading effects between the transmit path and the receive path such that output power and (NF) noise figure are not degraded after tying the transmit path and the receive path together.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The present invention relates generally to radio transceivers and more particularly relates to transmit/receive (T/R) switch functionality in such transceivers. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Figure 1:
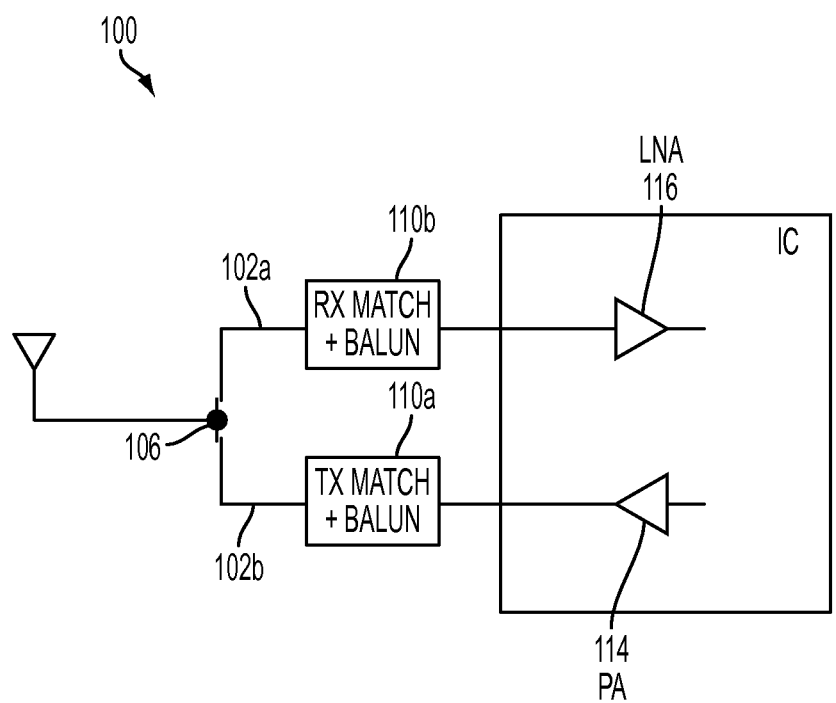
FIG. 1 shows a circuit in which the transmit path and the receive path are simply tied together after the matching.

FIG. 1 shows a circuit 100 in which the receive path 102a and the transmit path 102b are simply tied together at point 106 after the matching networks 110a and 110b. Without a transmit/receive (T/R) switch, during the transmit mode, the transmit path output node of power amplifier 114 will be loaded by the receive path impedance, determined by the receive path matching network 110b and the receive path off-mode input impedance. This loading effect may degrade the transmit path output match and cause a reduction in output power. During the receive path mode, without any switch, the receive path input of low noise amplifier (LNA) 116 will be loaded by the transmit path impedance, determined by the transmit path matching network 110a and transmit path off-mode output impedance. This loading effect may degrade the receive path input match and cause an increase in the receive path noise figure (NF).

Figure 2:
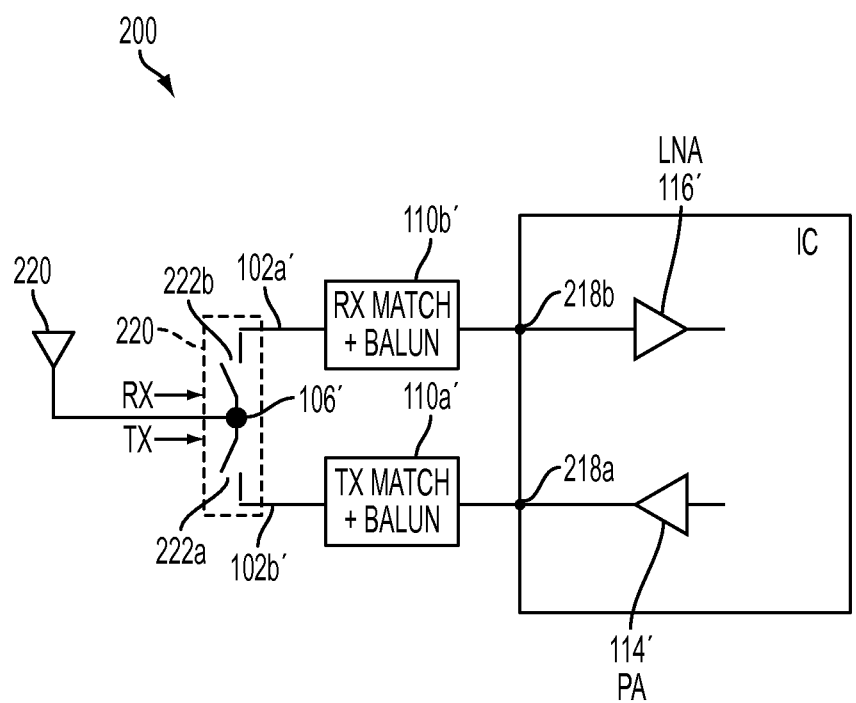
FIG. 2 shows a conventional implementation of a T/R switch in a transceiver.

FIG. 2 shows a conventional implementation transceiver 200 which includes transmit/receive functionality. Both the transmit path 102b' and the receive path 102a' have separate impedance matching to optimize transmit path output power and receive path noise figure. Balun 110a' and 110b' are also needed if the transmit path port 218a and/or receive path port 218b on the IC are differential. A single-pole, double-throw (SPDT) switch 220 is then used to connect either the transmit path 218a or receive path signal 218b to the antenna 220', depending on the transmit path/receive path control signal. In transmit path mode, the transmit path switch 222a is closed, and the receive path switch 222b is open. This provides low loss for the transmit path 102b' and high isolation from the transmit path 102b' to the receive path 102a'. In the receive path mode, the receive path switch 222b is closed, and the transmit path switch 222a is open. This provides low loss for the receive path 102a' and high isolation from the receive path 102a' to the transmit path 102b'. This fully integrated T/R switch 220 requires on-chip matching of both the receive and transmit front ends. This adds additional loss on both the transmit and receive paths 102b' and 102a'.

Accordingly, the present invention addresses these issues by integrating the switches but the matching is kept external, thereby minimizing loss. In so doing, the loading efforts between transmit and receive paths are minimized such that the output power and noise figure (NF) are not degraded when the receive and transmit paths are tied together. To describe the features of the present invention in more detail, refer now to the following description in conjunction with the accompanying Figure.

Figure 3:
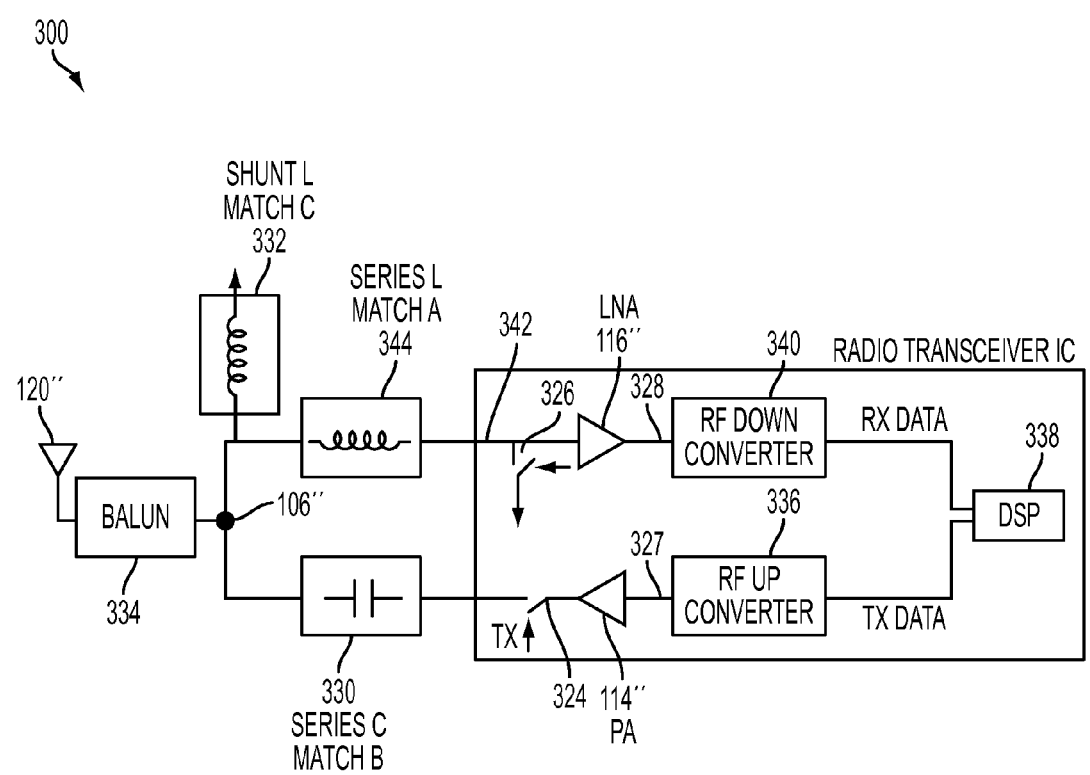
FIG. 3 shows a block diagram of a radio transceiver in accordance with the present invention.

FIG. 3 shows a block diagram of a radio transceiver 300 in accordance with the present invention. A series switch 324 is placed at the power amplifier (PA) 114" output, a shunt switch 326 is placed at the low noise amplifier (LNA) input 116", and external matching networks 330, 332 and 344 for the transmit path 327 and the receive path 328 are designed to ensure minimal loading from one path to the other. After the transmit path 327 and the receive path 328 are combined at port 106", a shared balun 334 can be used to convert differential signals to single-ended signals to interface with the antenna 120".

The power amplifier (PA) 114" is coupled to a RF Up Converter 336, which is then coupled to a DSP 338 to provide the transmit path 327. In the transmit mode, the series switch 324 is closed and the shunt switch 326 is closed. At the point 106", a large inductance is seen looking into the RX input path due to the combination of external matching network 344 and package bonding wire inductance. This inductance is terminated by the shunt switch 326 that offers a low resistance to ground, keeping the Q of this inductance high. The high impedance looking into the receive path 328 means that the transmit path 327 match will be largely unaffected. The high impedance of the matching network in combination with the low resistance of the shunt switch 326 at LNA 116" input means that the large PA 324 output will be attenuated through voltage division. This prevents the PA 324 output from damaging the input LNA 116" transistor's gate.

The low noise amplifier (LNA) 116" is coupled to a RF Down Converter 340, which is then coupled to the DSP 338 to provide the receive path 328. In the receive mode, both the series switch 324 and the shunt switch 326 are open. The series matching network 344 matches the balun 334 output to the LNA 116" output. The open shunt switch 326 has little effect on noise figure. Because the series switch 324 is open, the receive path 328 signal (at the point 106" where the transmit path and the receive path are joined) sees a high impedance looking into the transmit path 327, including the series combination of the capacitor of the matching network 330 and the parasitic capacitance of the switch 324.

This series capacitance is dominated by the parasitic capacitance of the switch 324 and is small, on the order of 100 fF. As a result, the transmit path 327 side presents minimal loading to the matching network 344, keeping noise figure (NF) largely unaffected. Matching network 332 includes a shunt inductor whose value is optimized to provide impedance matching for both the transmit path 327 and the receive path 328.

A method and system in accordance with an embodiment uses a combination of integrated switches and external inductors and capacitors to implement the T/R switch functionality. It eliminates the cost and board space penalties associated with the use of an external T/R switch. By keeping the matching components external, the transmit path and the receive path performance is optimized due to the availability of higher-Q and lower-loss external components (compared to integrated matching). External matching also allows greater flexibility and tenability at the board level. The additional on-chip switches use very little die area.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A transceiver comprising:
    an integrated circuit that includes a transmit path, a first switch coupled in series with an output of the transmit path, a receive path, and a second switch coupled as a shunt with an input of the receive path; and
    a plurality of external matching networks coupled to the transmit and receive paths of the integrated circuit to reduce loading from one path to other, wherein the first switch is located between the plurality of external matching networks and a power amplifier of the transmit path and the second switch is located between the plurality of external matching networks and a low noise amplifier of the receive path, wherein the plurality of external matching networks are external to the integrated circuit of the transceiver and are all directly coupled to a shared balun via a single port to convert differential signals from the plurality of external matching networks into single-ended signals that interface with an antenna coupled to the shared balun, wherein the plurality of external matching networks further comprises a first network as a series inductance network for providing a large inductance when the integrated circuit is in a transmit mode and providing an impedance match to the LNA input when the integrated circuit is in a receive mode; a second network as a series capacitance network for providing minimal loading when in the receive mode; and a third network as a shunt inductance network for providing impedance matching for the receive and the transmit paths.

2. The transceiver of claim 1, wherein the integrated circuit is a radio transceiver integrated circuit.

3. The transceiver of claim 1, wherein the receive path comprises a low noise amplifier (LNA) and an RF Down Converter coupled to the LNA, and the transmit path comprises a power amplifier (PA) and an RF Up Converter coupled to the PA.

4. The transceiver of claim 1, wherein the first and second switches are closed when the transceiver is in a transmit mode, and the first and second switches are open when the transceiver is in a receive mode.

5. The transceiver of claim 3, further comprising:
    a digital signal processor for receiving data from the RF Down Converter and for transmitting data to the RF Up Converter.

6. A method comprising:
    providing an integrated circuit that includes a transmit path, a first switch coupled in series with an output of the transmit path, a receive path, and a second switch coupled as a shunt with an input of the receive path; and
    providing a plurality of external matching networks coupled to the transmit and receive paths of the integrated circuit to reduce loading from one path to other, wherein the first switch is located between the plurality of external matching networks and a power amplifier of the transmit path and the second switch is located between the plurality of external matching networks and a low noise amplifier of the receive path, wherein the plurality of external matching networks are external to the integrated circuit of the transceiver and are all directly coupled to a shared balun via a single port to convert differential signals from the plurality of external matching networks into single-ended signals that interface with an antenna coupled to the shared balun, wherein the plurality of external matching networks further comprises a first network as a series inductance network for providing a large inductance when the integrated circuit is in a transmit mode and providing an impedance match to the LNA input when the integrated circuit is in a receive mode; a second network as a series capacitance network for providing minimal loading when in the receive mode; and a third network as a shunt inductance network for providing impedance matching for the receive and the transmit paths.

7. The method of claim 6, wherein the receive path comprises a low noise amplifier (LNA) and an RF Down Converter coupled to the LNA, and the transmit path comprises a power amplifier (PA) and an RF Up Converter coupled to the PA.

8. The method of claim 6, further comprising:
closing the first and second switches when the transceiver is in a transmit mode, and opening the first and second switches when the transceiver is in a receive mode.

9. The method of claim 7, further comprising:
receiving data from the RF Down Converter and transmitting data to the RF Up Converter by a digital signal processor.

* * * * *